United States Patent
Caponetti et al.

(10) Patent No.: US 11,976,631 B2
(45) Date of Patent: May 7, 2024

(54) METHOD OF MEASURING STALL CONDITION OF WIND TURBINE ROTOR

(71) Applicant: VESTAS WIND SYSTEMS A/S, Aarhus N. (DK)

(72) Inventors: Fabio Caponetti, Åbyhøj (DK); Karthik Vasudevan, Viby J (DK); James Alexander Nichols, Epsom (GB); Jacob Deleuran Grunnet, Tranbjerg J (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 18/010,788

(22) PCT Filed: Jun. 15, 2021

(86) PCT No.: PCT/DK2021/050194
§ 371 (c)(1),
(2) Date: Dec. 15, 2022

(87) PCT Pub. No.: WO2021/254578
PCT Pub. Date: Dec. 23, 2021

(65) Prior Publication Data
US 2023/0243336 A1 Aug. 3, 2023

(30) Foreign Application Priority Data
Jun. 15, 2020 (DK) .............................. PA 2020 70388

(51) Int. Cl.
*F03D 7/02* (2006.01)

(52) U.S. Cl.
CPC ......... *F03D 7/0256* (2013.01); *F03D 7/0224* (2013.01); *F05B 2270/32* (2013.01);
(Continued)

(58) Field of Classification Search
CPC ...... F03D 7/0256; F03D 7/0224; F03D 17/00; F05B 2270/32; F05B 2270/327;
(Continued)

(56) References Cited

U.S. PATENT DOCUMENTS

| | | | |
|---|---|---|---|
| 11,261,845 B2 * | 3/2022 | Vaddi | ...................... F03D 17/00 |
| 2010/0098540 A1 | 4/2010 | Fric et al. | |

(Continued)

FOREIGN PATENT DOCUMENTS

| | | |
|---|---|---|
| EP | 2644887 A2 | 10/2013 |
| EP | 2679808 A1 | 1/2014 |

(Continued)

OTHER PUBLICATIONS

Danish Patent Office, Search Opinion for Danish Patent Application No. PA 2020 70388, dated Nov. 30, 2020.
(Continued)

*Primary Examiner* — Brandon D Lee
(74) *Attorney, Agent, or Firm* — Patterson + Sheridan, LLP

(57) ABSTRACT

Methods of measuring a stall condition of a rotor of a wind turbine are disclosed. In one aspect a stall parameter is obtained on the basis of the power parameter and a thrust parameter; and the stall parameter compared with a threshold to determine a stall condition of the rotor.

14 Claims, 7 Drawing Sheets

(52) U.S. Cl.
CPC ... *F05B 2270/327* (2013.01); *F05B 2270/328* (2013.01); *F05B 2270/335* (2013.01); *F05B 2270/70* (2013.01)

(58) Field of Classification Search
CPC .......... F05B 2270/328; F05B 2270/335; F05B 2270/70; F05B 2260/80; F05B 2260/84; F05B 2270/20; Y02E 10/72
See application file for complete search history.

(56) References Cited

U.S. PATENT DOCUMENTS

| | | |
|---|---|---|
| 2017/0058871 A1 | 3/2017 | Movsichoff et al. |
| 2019/0107102 A1 | 4/2019 | Marwaha et al. |
| 2020/0032771 A1 | 1/2020 | Vaddi et al. |

FOREIGN PATENT DOCUMENTS

| | | |
|---|---|---|
| EP | 3470670 A1 | 4/2019 |
| EP | 3599375 A1 | 1/2020 |
| EP | 3712430 A1 | 9/2020 |

OTHER PUBLICATIONS

Danish Patent Office, Search Report for Danish Patent Application No. PA 2020 70388, dated Nov. 30, 2020.
International Search Report and Written Opinion for PCT Application No. PCT/DK2021/050194, dated Sep. 15, 2021.

* cited by examiner

METHOD OF MEASURING STALL CONDITION OF WIND TURBINE ROTOR

FIELD OF THE INVENTION

The present invention is directed to measuring a stall condition of a rotor of a wind turbine.

BACKGROUND OF THE INVENTION

Aerodynamic stall causes a decrease in lift and an increase in drag coefficients for a wind turbine blade. The onset of stall is signalled by a sharp change in a wind turbine's performance evident by degradation in output power versus expect power.

EP2679808 discloses a stall sensor for a wind turbine. The stall sensor comprises detector means adapted to measure vibration of a rotor blade of the wind turbine and to output a vibration signal representative of the vibration of the rotor blade, conversion means connected to the detector means and adapted to determine a noise figure representative of a spectral signal content within a frequency band of the vibration signal received from the detector means and arbiter means connected to the conversion means and adapted to signal a presence or an absence of stall based on the noise figure received from the conversion means.

SUMMARY OF THE INVENTION

A first aspect of the invention provides a method of measuring a stall condition of a rotor of a wind turbine, the method comprising measuring a power parameter indicative of a power generated by the rotor; measuring a thrust parameter indicative of a thrust force generated by the rotor; obtaining a stall parameter on the basis of the power parameter and the thrust parameter; and comparing the stall parameter with a threshold to determine a stall condition of the rotor.

The method of the first aspect of the invention has the advantage that it may use readily available sensors, not requiring additional hardware in the form of a dedicated stall sensor.

Another advantage is that by using both a power parameter and a thrust parameter to obtain the stall parameter, the reliability of the measurement may be improved compared with a method which only analyses power or thrust.

The power parameter may be based on a sum of an electrical power generated by the rotor and a power loss parameter.

The method may further comprise obtaining a wind speed measurement and normalising the stall parameter on the basis of the wind speed measurement. A wind speed measurement may also be an estimated wind speed obtained from measured values, The power parameter may be a power coefficient, and the thrust parameter may be a thrust coefficient.

The method may further comprise determining an operating point of the rotor; obtaining a theoretical power parameter and a theoretical thrust parameter based on the operating point of the rotor; and obtaining the stall parameter on the basis of the theoretical power parameter and the theoretical thrust parameter.

The theoretical power parameter and theoretical thrust parameter may be obtained by inputting the operating point of the rotor into a look up table.

The operating point of the rotor may be based on a tip speed ratio and/or a blade pitch angle of the rotor.

The method may further comprising obtaining a time series of measurements of a performance parameter indicative of a performance of the rotor, each measurement in the time series being associated with an operating point of the rotor; analysing the time series of measurements to obtain a statistical measure of a sensitivity of the performance parameter with respect to the operating point of the rotor; and comparing the statistical measure with a threshold to determine the stall condition of the rotor.

The performance parameter may be indicative of a power or a thrust generated by the rotor.

The statistical measure may be a standard deviation, variance, root mean square or sum of squares.

The stall condition may indicate that the rotor is stalled when the statistical measure exceeds the threshold.

The method may be repeated overtime to obtain a time series of measurements of the stall condition of the rotor; and the time series of measurements of the stall condition of the rotor may be analysed by a statistical change detection algorithm to confirm a change in the stall condition.

A further aspect of the invention provides a method of determining a stall condition of a rotor of a wind turbine, the method comprising obtaining a time series of measurements of the wind turbine; and analysing the time series of measurements by a statistical change detection algorithm to determine whether the rotor has stalled.

The use of a statistical change detection algorithm provides a more reliable indication of a change in the stall condition than a single stall condition measurement.

The statistical change detection algorithm may include a calculation of a cumulative sum, which may be compared with a threshold to confirm the change in the stall condition and/or to determine whether the rotor has stalled.

The statistical change detection algorithm may be a leaky bucket algorithm or a CUSUM algorithm.

The stall condition may be a binary estimation of whether or not the rotor has stalled.

A further aspect of the invention provides a method of controlling a wind turbine, the wind turbine comprising a rotor with one or more wind turbine blades, the method comprising: determining a stall condition of the rotor by a method according to the preceding aspect of the invention, and controlling the wind turbine in accordance with the stall condition.

Controlling the wind turbine in accordance with the stall condition may comprise adjusting a pitch angle of the wind turbine blades, adjusting a generator torque of the wind turbine, or adjusting any other part of the wind turbine.

Controlling the wind turbine in accordance with the stall condition may comprise adjusting a pitch angle of the wind turbine blades in response to a change in the stall condition.

A further aspect of the invention provides a computer program product comprising software code adapted to determine a stall condition of a rotor of a wind turbine when executed on a data processing system, the computer program product being adapted to perform the method of any preceding aspect.

Aspects of the invention may be implemented in a wind turbine stall measurement system configured to determine a stall condition of a rotor of a wind turbine.

BRIEF DESCRIPTION OF THE DRAWINGS

Embodiments of the invention will now be described with reference to the accompanying drawings, in which.

DESCRIPTION OF EMBODIMENTS

Figure 1:
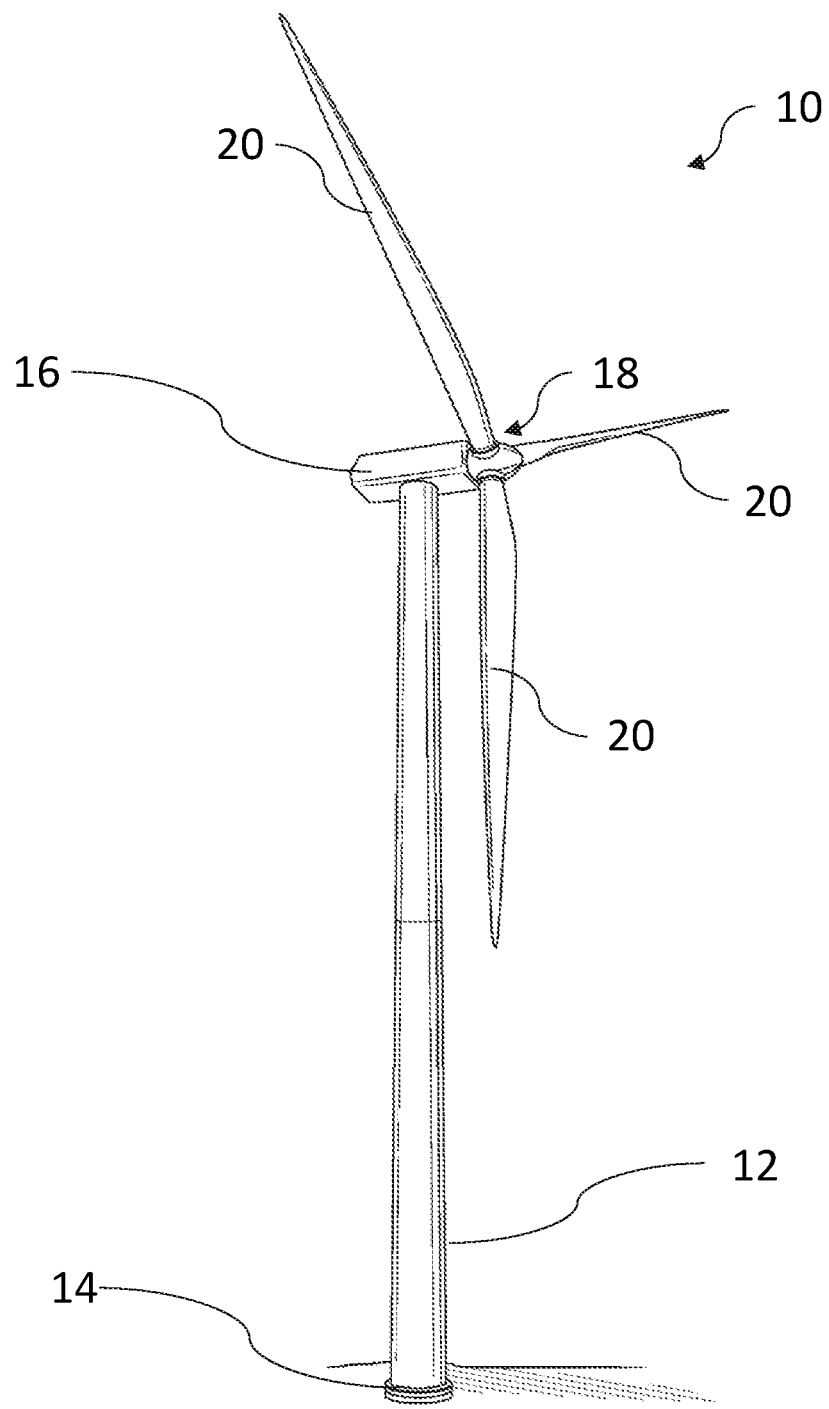
FIG. 1 shows a general view of a wind turbine blade.

FIG. 1 shows a general view of a wind turbine 10 having a main tower 12 extending upwardly from a foundation 14 and supporting a nacelle 16. A rotor 18 is rotatably mounted on the nacelle 16. The rotor 18 has blades 20 extending radially outwardly from it and wind incident on the wind turbine 10 may rotate the blades 20 and thereby rotate the rotor 18. The rotor 18 may transfer rotational movement to a generator housed within the nacelle 16, which may generate electricity. The electricity generated may then be transferred to a grid or other power supply network outside the wind turbine 10. The wind turbine may also comprise various sensors, which are not shown, such as anemometers, and power meters, as well as encoders for measuring the rotational speed of the rotor 18.

Ice, sand, or other debris may build up on the wind turbine blades 20 and the aerodynamic characteristics of the blade may therefore change. Accordingly, the torque transferred to the generator and the amount of electricity produced may be reduced. The lift and/or drag curves of the blade may also change, and the blade may stall unexpectedly.

The aerodynamic performance of the blades may also be reduced or otherwise changed due to abrasion of the leading edge or other damage to the wind turbine blade such as airborne debris.

Figure 2:
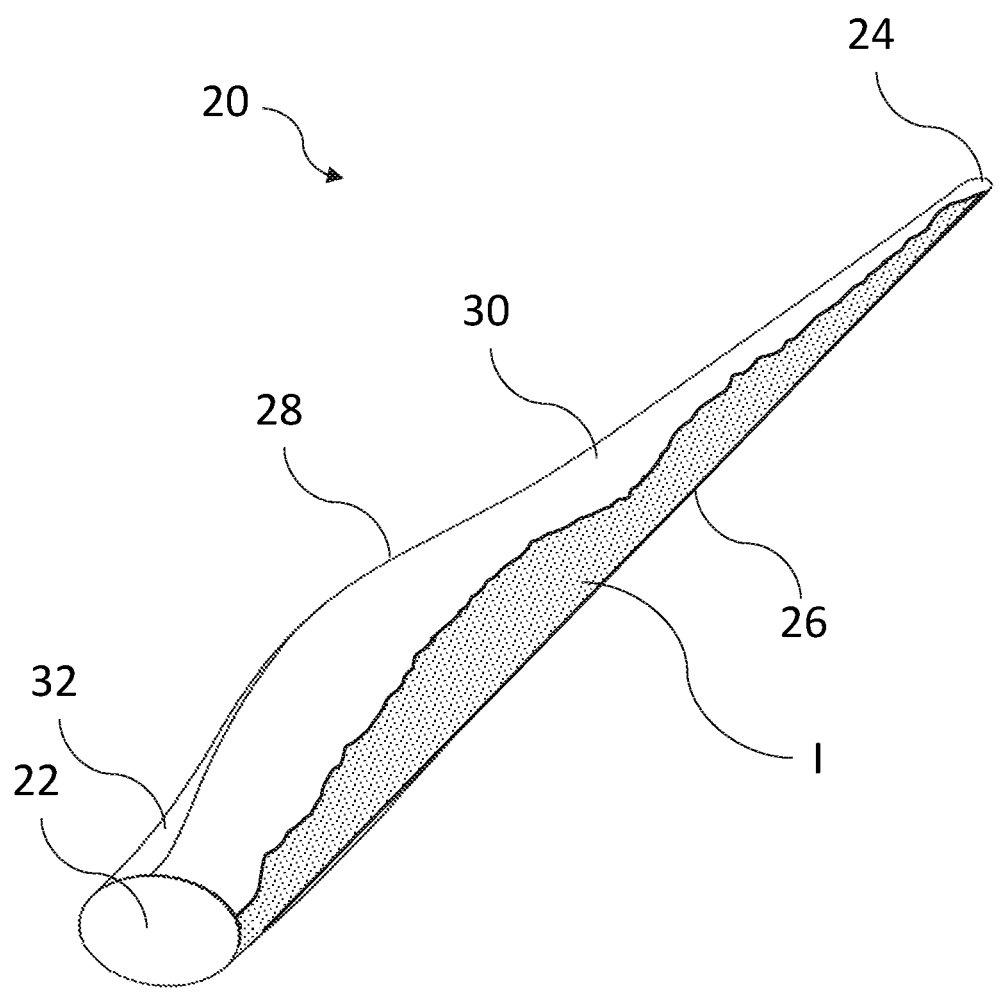
FIG. 2 shows a general view of a degraded wind turbine blade.

An example of a degraded wind turbine blade is shown in FIG. 2. The wind turbine blade 20 extends from a root end 22 to a tip end 24, having a leading edge 26 extending therebetween, the leading edge 26 being arranged to face into the wind as the blade moves, and a trailing edge 28 which is arranged to face out of the wind. The wind turbine blade 20 also has two major aerodynamic surfaces: a pressure surface 30 and a suction surface 32.

In FIG. 2, ice I can also be seen, which has built up on the pressure surface 30 of the wind turbine blade 20 near the leading edge 26. It will, however, be understood that ice and other debris may build up anywhere on the wind turbine blade such as at the trailing edge 28 or may be localised at the root end 22 or at the tip end 24.

In order to obtain data over a range of wind turbine blade degradation states, wind turbine blades may be simulated or modelled with a range of different debris conditions and may be categorised according to their reduction in power coefficient. Data pertaining to a wind turbine blade having a particular degradation state may therefore not be indicative of data for a specific wind turbine blade having a specific debris build up pattern, but may be a heuristic generally indicating expected wind turbine blade characteristics.

Figure 3:
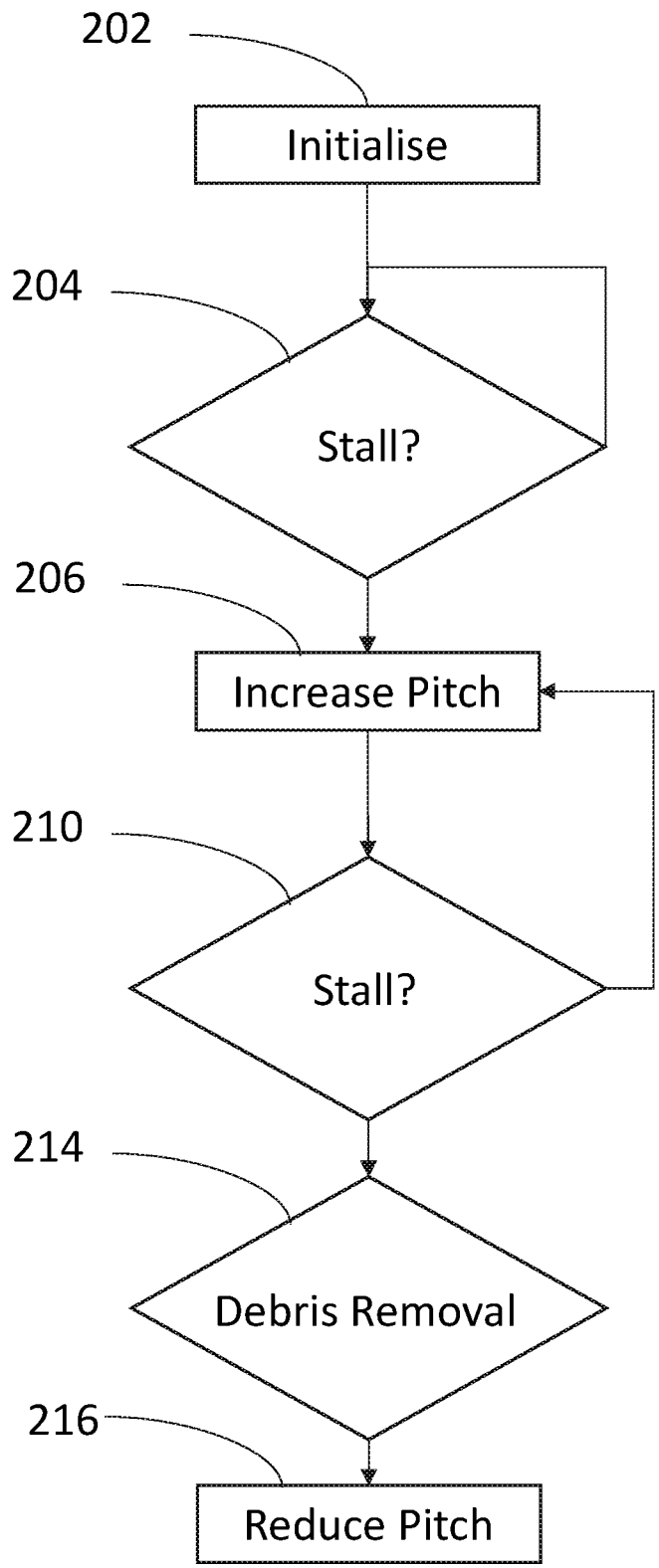
FIG. 3 is a flowchart illustrating a control method.

FIG. 3 shows a flowchart illustrating a method of controlling the rotor 18. The system may be initialised at step 202. The initialisation may comprise obtaining necessary data, which may be data related to power coefficients expected from wind turbine blades at a range of pitch angles and degradation states and/or measuring a tip speed ratio of the blade.

The stall condition of the rotor is measured at step 204, to determine whether the rotor is stalled or not stalled. Initially, the rotor is not stalled. Various methods of measuring the stall condition at step 204 are described below.

Once stall is detected, the pitch angle may be increased at step 206 in response to the change in the stall condition of the rotor.

At the new operating point, it may be determined again whether the rotor is stalled or not stalled at step 210. The determination made may be substantially similar to the detection of stall at step 204. If stall is detected, then the pitch angle may be increased again at 206, and if attached flow is detected (indicating that the rotor is not stalled) then the process may move to step 214.

At step 214 debris removal may be determined. This may be by detecting a power coefficient of the blade or by other sensors, such as frost sensors. If it is determined that a sufficient amount of debris has been removed, then the pitch angle may be reduced at step 216. Otherwise, the wind turbine blade may be maintained at its current pitch angle for a longer time.

The reduction of the pitch angle at step 216 may be a straightforward reduction in pitch angle or may involve the implementation of a more complex wind turbine blade control scheme.

Figure 4:
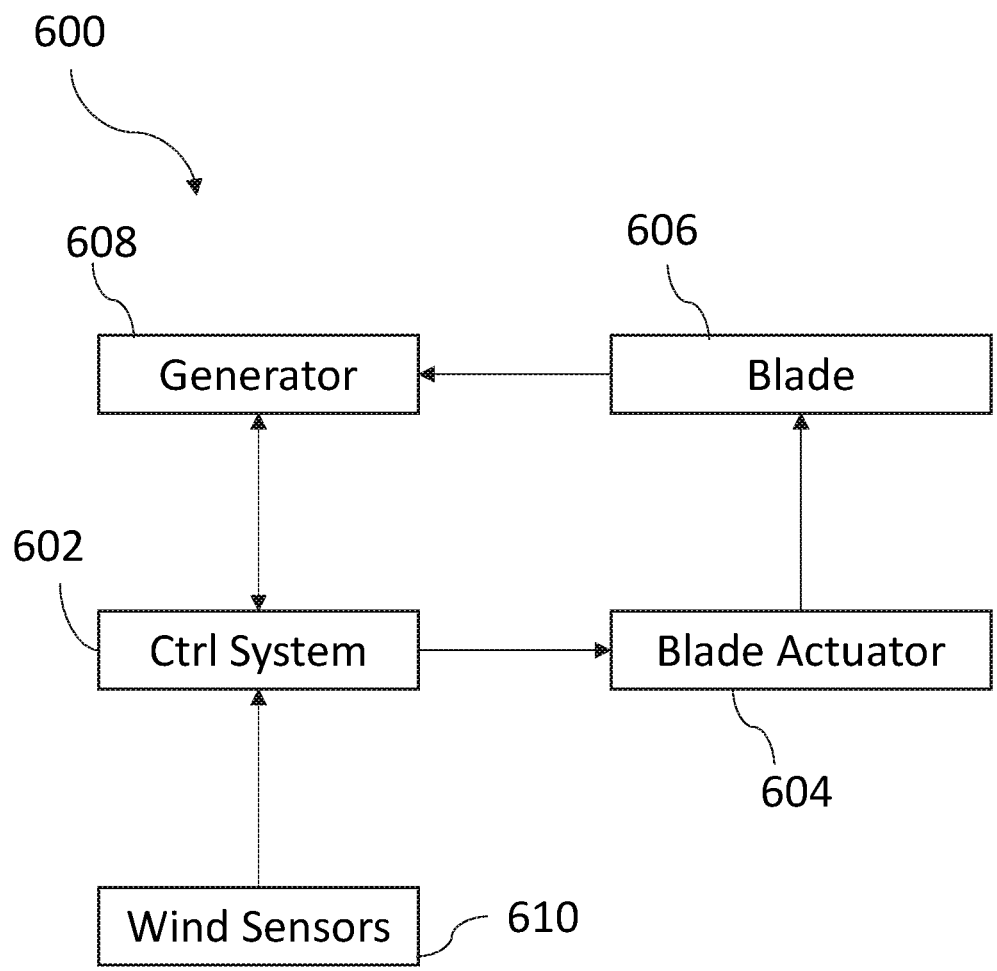
FIG. 4 is a schematic system diagram of a wind turbine.

FIG. 4 shows a schematic control diagram showing certain features of a wind turbine 600 which may be used within the method described above. The wind turbine may comprise a control system 602. The control system 602 may have a memory, which may store data pertaining to power coefficients and pitch angles of the blade at various states of degradation and may store instructions for carrying out the control methods. The control system 602 may also comprise a processor for carrying out the method.

The control system 602 may control a wind turbine blade actuator 604, which may be a motor arranged to alter a pitch angle of a wind turbine blade 606. The wind turbine blade 606 may provide rotational movement to a wind turbine generator 608, which may generate electricity. The amount of electricity generated may therefore provide a measure of the torque from the wind turbine blade 606. The wind turbine generator 608 may supply electrical power to an electrical grid and the control system 602 may determine the power output by the wind turbine blade by measuring the power output to the grid by the wind turbine generator 608 and compensating for any power losses within the wind turbine 600.

The wind turbine 600 may also have wind sensors 610, which may measure wind speed and/or wind direction in order to determine a tip speed ratio of the wind turbine blade and the wind speed may also be used in determining the power coefficient of the wind turbine blade 606. The wind sensors 610 may provide such data to the control system 602.

FIGS. 5-11 show various methods of measuring a stall condition of the rotor 18 of a wind turbine, which may be used to determine whether the rotor is stalled or not stalled at step 204 and/or step 210. The methods use readily available sensors, thus not requiring additional hardware.

The control system 602 may have a memory and a data processing system. The memory stores a computer program product comprising software code adapted to determine a stall condition of the rotor when executed on the data processing system. Thus, the control system 602 provides a wind turbine stall measurement system configured to measure a stall condition using the method of any of FIGS. 5-11.

The computer program product may also be adapted to perform the control method of FIG. 3.

Figure 5:
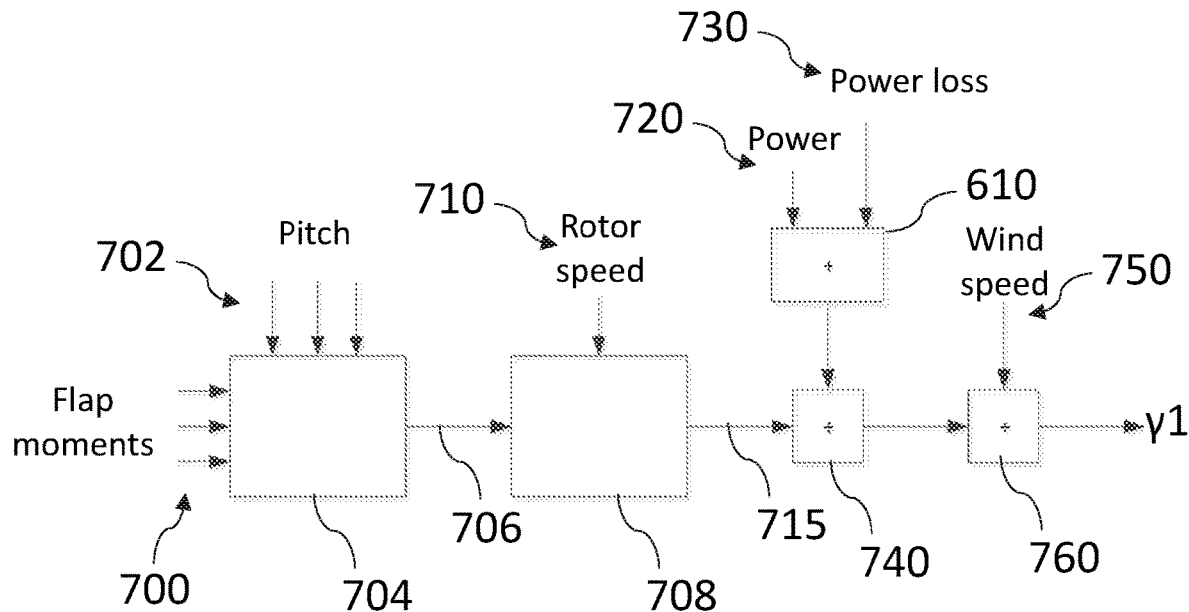
FIG. 5 shows a method of measuring a stall parameter γ1.
Figure 6:
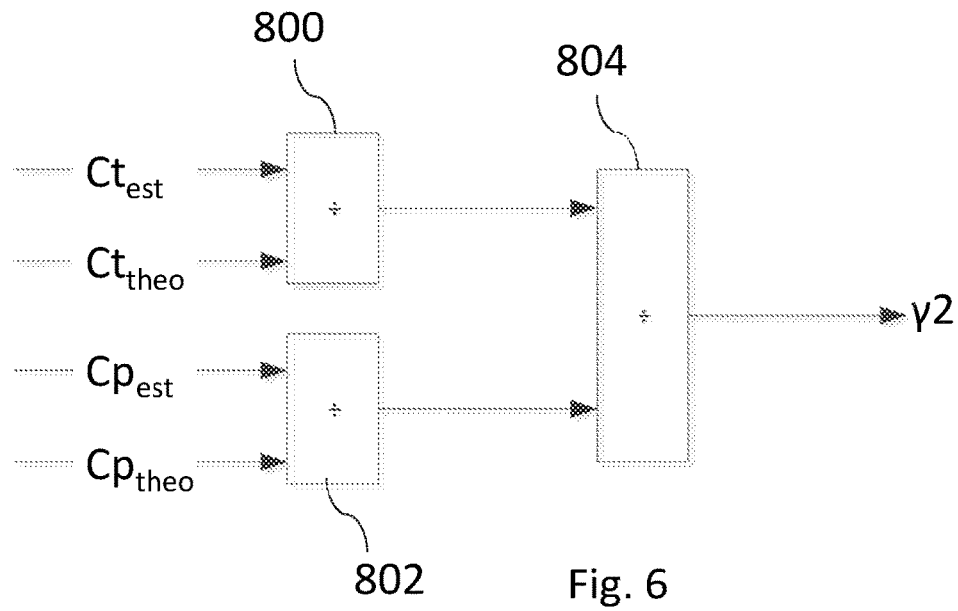
FIG. 6 shows a method of measuring a stall parameter γ2.

The methods of FIGS. 5 and 6 measure a power parameter indicative of a power generated by the rotor 18; measure a thrust parameter indicative of a thrust force generated by the rotor; obtain a stall parameter γ1 or γ2 on the basis of the power parameter and the thrust parameter; and compare the stall parameter γ1 or γ2 with a threshold to determine the stall condition of the rotor.

In the case of FIG. 5, a stall parameter γ1 is calculated in accordance with Equation (1):

$$\gamma 1 = \frac{(\text{Power}_{loss} + \text{Power}_{grid})}{\text{ThrustForce} * \text{WindSpeed}} \qquad \text{Equation (1)}$$

where: $\text{Power}_{loss}$ is the electrical power generated by the rotor 18 but lost as heat within the generator 608 and any other part of the wind turbine (such as the drive train including any gearbox); $\text{Power}_{grid}$ is the electrical power delivered to the grid by the generator 608; ThrustForce is the thrust force generated by the rotor 18, and WindSpeed is the wind speed measured by the wind sensors 610.

The electrical power ($\text{Power}_{grid}$) delivered to the grid by the generator 608 may be measured by measuring voltages and currents in the output from the generator 608.

The power loss parameter ($\text{Power}_{loss}$) may be obtained by estimation, for instance based on known design parameters of the drive train, and a power loss model which estimates the power lost to heat based on the rotor speed and the friction in the drive train. Alternatively the power loss parameter ($\text{Power}_{loss}$) may be measured more directly, for instance by measuring the temperature of the lubricating oil of the drive train.

The power loss parameter ($\text{Power}_{loss}$) is particularly important for cases where there is a high degradation in performance such that $\text{Power}_{grid}$ is so low that it is comparable with $\text{Power}_{loss}$.

As shown in FIG. 5, the thrust force 706 may be measured by obtaining flapwise bending moments 700 of the three blades 20; obtaining pitch angles 702 of the three rotor blades; and at step 704 using the pitch angles 702 to project the flapwise bending moments 700 onto the axis of the rotor (which is out of the plane of the rotor) and summing the projected bending moments 700 to produce a thrust force 706 which is normalised at step 708 on the basis of the rotor speed 710 to produce a normalized thrust force 715.

At any given radial position the load can be projected to an in plane and out of plane moment. The out of plane moment gives the force (knowing the moment arm) which can then be used to determine the acting thrust force on the rotor.

The flapwise bending moments 700 may be obtained by direct measurement, for instance using strain sensors on the blades or any other direct measurement technique.

The power 720 and power loss 730 are then divided by the normalised thrust force 715 at step 740 and divided by a wind speed measurement 750 at step 760 to produce the stall parameter γ1. Thus, the stall parameter γ1 is normalised on the basis of the wind speed measurement 750.

The stall parameter γ1 may then be compared with a threshold to determine the stall condition. For instance, the stall condition may indicate that the rotor 18 is not stalled when the stall parameter γ1 exceeds the threshold, and/or the stall condition may indicate that the rotor 18 is stalled when the stall parameter γ1 is below the threshold.

The power parameter in Equation (1) is based on a sum ($\text{Power}_{loss}+\text{Power}_{grid}$) of an electrical power ($\text{Power}_{grid}$) generated by the rotor and a power loss parameter ($\text{Power}_{loss}$); and the thrust parameter (ThrustForce) in Equation (1) is based on a direct measurement of flapwise bending moments.

In a second method shown in FIG. 6, the power parameter is a power coefficient and the thrust parameter is a thrust coefficient. Specifically, the stall parameter γ2 in the case of FIG. 6 is calculated in accordance with Equation (2):

$$\gamma 2 = \left(\frac{Cp_{est}}{Cp_{theo}}\right)\left(\frac{Ct_{est}}{Ct_{theo}}\right) \qquad \text{Equation (2)}$$

where: $Cp_{est}$ an estimated power coefficient based on a current operating point of the rotor, $Ct_{est}$ is an estimated thrust coefficient based on the current operating point of the rotor; $Cp_{theo}$ is a theoretical power coefficient based on the current operating point of the rotor, and $Ct_{theol}$ is a theoretical thrust coefficient based on the current operating point of the rotor.

The estimated coefficients $Cp_{est}$ and $Ct_{est}$ may be estimated online from the current operating point by inverting the well-known relations linking power and thrust to the wind speed, air density, tip-speed ratio and pitch angle.

For example, the estimated power coefficient $Cp_{est}$ may be obtained on the basis of equation (3):

$$Cp_{est} = \frac{(\text{Power}_{loss} + \text{Power}_{grid})}{\frac{1}{2}\rho A V^3} \qquad \text{Equation (3)}$$

where: $\text{Power}_{loss}$ is the electrical power generated by the rotor 18 but lost as heat within the generator 608 and any other part of the wind turbine (such as the drive train including any gearbox); $\text{Power}_{grid}$ is the electrical power delivered to the grid by the generator 608; ρ is the air density; A is the swept area of the rotor 18; and V is the wind speed.

Similarly, the estimated thrust coefficient $Ct_{est}$ may be obtained on the basis of Equation (4):

$$Ct_{est} = \frac{\text{ThrustForce}}{\frac{1}{2}\rho A V^2} \qquad \text{Equation (4)}$$

where: ThrustForce is the thrust force generated by the rotor 18; ρ is the air density; A is the swept area of the rotor 18; and V is the wind speed.

The ThrustForce parameter in equation (4) may be obtained in the same as the ThrustForce parameter in equation (1), using the method shown in FIG. 5 including normalisation based on the rotor speed.

Alternatively, rather than normalizing based on rotor speed, the ThrustForce parameter in equation (4) may be normalized versus the rated thrust force, i.e. the force acting on the rotor, in power curve conditions, when producing rated power at rated wind speed.

The theoretical coefficients $Cp_{theo}$ and $Ct_{theo}$ may be obtained by inputting the current tip-speed ratio and blade pitch angle into a look-up-table which is generated during blade design.

The stall parameter $\gamma2$ may then be compared with a threshold to determine the stall condition. For instance, the stall condition may indicate that the rotor 18 is not stalled when the stall parameter $\gamma2$ exceeds the threshold, and/or the stall condition may indicate that the rotor 18 is stalled when the stall parameter $\gamma2$ is below the threshold.

The stall parameter $\gamma2$ in Equation (2) is mathematically equivalent to the stall parameter $\gamma1$ in Equation (1) multiplied by a factor which varies on the basis of the operating point of the rotor. In other words, the stall parameters $\gamma1$ and $\gamma2$ are related according Equation (5):

$$\gamma2 = \gamma1 \left(\frac{Ct_{theo}}{Cp_{theo}}\right) \quad \text{Equation (5)}$$

Thus Equation (2) is mathematically equivalent to comparing the stall parameter $\gamma1$ from Equation (1) to a threshold, and varying the threshold on the basis of the operating point of the rotor—for example varying the threshold on the basis of $$\left(\frac{Ct_{theo}}{Cp_{theo}}\right).$$

FIG. 6 shows how Equation (2) may be implemented. $Ct_{est}$ and $Ct_{theo}$ are divided at step 800; $Cp_{est}$ and $Cp_{theo}$ are divided at step 802; and the outputs are divided at step 804 to generate the stall parameter $\gamma2$ which is then compared with a threshold.

The methods of FIGS. 5 and 6 take advantage of the fact that during stall the power reduces and the thrust increases (or does not decrease). By using both a power parameter and a thrust parameter to obtain the stall parameter $\gamma1$ or $\gamma2$, the reliability of the measurement is improved compared with a method which only analyses the power or thrust.

In further methods shown in FIGS. 7-10, the stall condition of the rotor is determined by obtaining a time series of measurements of a performance parameter indicative of a performance of the rotor (for instance Cp, Ct or similar), each measurement in the time series being associated with an operating point of the rotor (for instance tip speed ratio, blade pitch angle or similar); analysing the time series of measurements to obtain a statistical measure of a sensitivity of the performance parameter with respect to the operating point of the rotor (for instance standard deviation, variance, root-mean-square, sum of squares etc.); and comparing the statistical measure with a threshold to determine the stall condition of the rotor.

The methods of FIGS. 7-10 take advantage of the observation that when operating in deep stall, the fundamental sensitivities such as $$\frac{dCp}{d\vartheta} \text{ or } \frac{dCp}{d\lambda}$$

increase significantly compared to operating outside deep stall.

Figure 7:
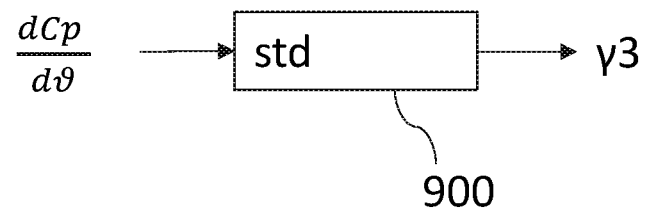
FIG. 7 shows a method of measuring a stall parameter γ3.

In the case of FIG. 7, a stall parameter $\gamma3$ is calculated according Equation (6):

$$\gamma3 = std\left(\frac{dCp}{d\theta}\right) \quad \text{Equation (6)}$$

where: Cp is a power coefficient based on a current operating point of the rotor; $\theta$ is a blade pitch angle; and std is a standard deviation function implemented in step 900 in FIG. 7.

Figure 8:
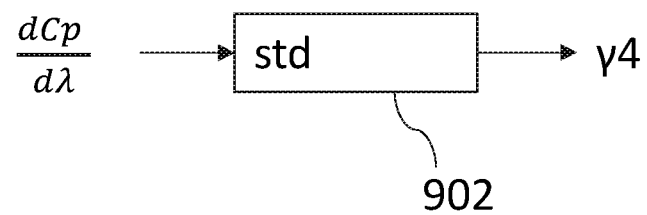
FIG. 8 shows a method of measuring a stall parameter γ4.

In the case of FIG. 8, a stall parameter $\gamma4$ is calculated according Equation (7):

$$\gamma4 = std\left(\frac{dCp}{d\lambda}\right) \quad \text{Equation (7)}$$

where: Cp is a power coefficient based on a current operating point of the rotor; $\lambda$ is a tip speed ratio; and std is a standard deviation function implemented in step 902 in FIG. 8.

Figure 9:
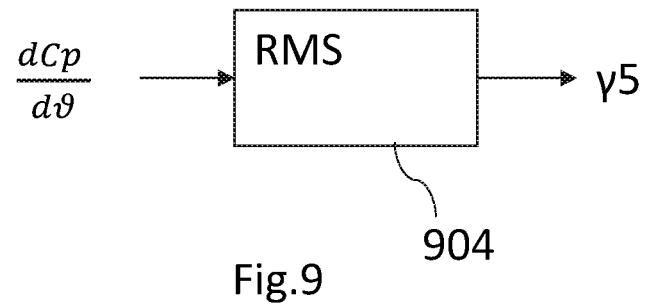
FIG. 9 shows a method of measuring a stall parameter γ5.

In the case of FIG. 9, a stall parameter $\gamma5$ is calculated according Equation (8):

$$\gamma5 = \text{rms}\left(\frac{dCp}{d\vartheta}\right) \quad \text{Equation (8)}$$

where: Cp is a power coefficient based on a current operating point of the rotor; $\theta$ is a blade pitch angle; and rms is a root-mean-square function implemented in step 904 in FIG. 9.

Figure 10:
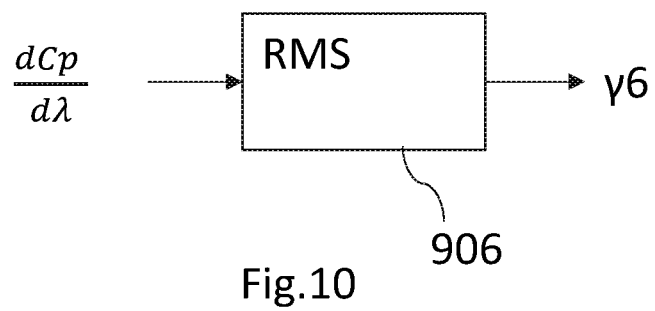
FIG. 10 shows a method of measuring a stall parameter γ6.

In the case of FIG. 10, a stall parameter $\gamma6$ is calculated according Equation (9):

$$\gamma6 = \text{rms}\left(\frac{dCp}{d\lambda}\right) \quad \text{Equation (9)}$$

where: Cp is a power coefficient based on a current operating point of the rotor; $\lambda$ is a tip speed ratio; and rms is a root-mean-square function implemented in step 906 in FIG. 10.

In the case of FIGS. 7 and 9, a time series of measurements of Cp is obtained, each measurement in the time series being associated with a respective blade pitch angle ($\theta$); and the time series is analysed to obtain a statistical measure of a sensitivity of Cp with respect to $\theta$.

In the case of FIGS. 8 and 10, a time series of measurements of Cp is obtained, each measurement in the time series being associated with a respective tip speed ratio ($\lambda$); and the time series is analysed to obtain a statistical measure of a sensitivity of Cp with respect to $\lambda$.

The power coefficient Cp in Equations (6) to (9) may be the same as the parameter $Cp_{est}$ in Equation (2), and may be obtained on the basis of Equation (3).

The sensitivity $$\frac{dCp}{d\vartheta}$$

could be obtained by changing the pitch, and the sensitivity $$\frac{dCp}{d\lambda}$$

could be obtained by correlating the wind speed (keeping the pitch constant) to variation of Cp.

In the case of FIGS. 7-10, the time series of measurements are measurements of Cp, but in other embodiments they may measure another performance parameter such as thrust coefficient Ct.

The stall parameter $\gamma 3$, $\gamma 4$, $\gamma 5$ or $\gamma 6$ may then be compared with a threshold to determine the stall condition. For instance the stall condition may indicate that the rotor 18 is stalled when the stall parameter $\gamma 3$, $\gamma 4$, $\gamma 5$ or $\gamma 6$ exceeds the threshold, and/or the stall condition may indicate that the rotor 18 is not stalled when the stall parameter $\gamma 3$, $\gamma 4$, $\gamma 5$ or $\gamma 6$ is below the threshold.

Once a stall parameter $\gamma 1$-$\gamma 6$ is chosen from the list above, its values are compared to a threshold. In some embodiments of the invention, when the stall parameter crosses the threshold, the pitch angle of the wind turbine blades is immediately adjusted in step 206 or step 216 in response to the change in the stall condition.

Figure 11:
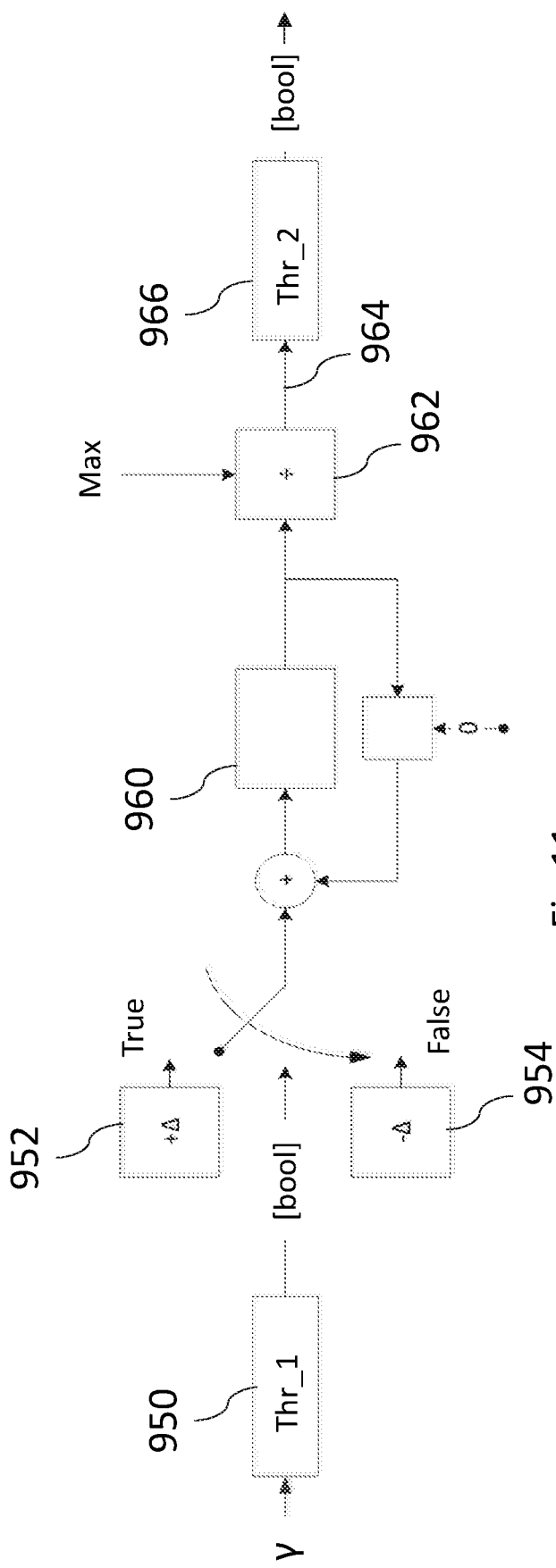
FIG. 11 shows a method of measuring a stall condition of a rotor of a wind turbine using any of the stall parameters.

In another embodiment of the invention, shown in FIG. 11, any potential change in the stall condition of the rotor is confirmed by a statistical change detection algorithm before the pitch angle of the wind turbine blades is changed. Thus the stall condition is determined by obtaining a time series of measurements of the wind turbine; and analysing the time series of measurements by a statistical change detection algorithm to determine whether the rotor has stalled. The use of a statistical change detection algorithm provides a more reliable indication of a change in the stall condition than a single stall condition measurement.

In the example of FIG. 11, once a first threshold (Threshold_1) is exceeded (in the case of $\gamma 3$, $\gamma 4$, $\gamma 5$ or $\gamma 6$) or dropped below (in the case of $\gamma 1$ or $\gamma 2$) a "leaky bucket" counter counts up, down otherwise. Once a second threshold (Threshold_2) on the counter state is exceeded, deep stall is detected.

The stall parameter is compared with a first threshold (Threshold_1) at step 950. If Threshold_1 is exceeded by the stall parameter (in the case of $\gamma 3$, $\gamma 4$, $\gamma 5$ or $\gamma 6$) or the stall parameter is less than Threshold_1 (in the case of $\gamma 1$ or $\gamma 2$) then the step 950 outputs a logical "true" which indicates that the rotor has potentially stalled. Otherwise the step 950 outputs a logical "false".

A counter is incremented at step 952 when the step 950 outputs a logical "true", and decremented at step 954 when the step 950 outputs a logical "false".

A Min/Max function 960 places a maximum limit (Max) on the counter, and a minimum value of zero. The counter is initialised as zero. So if there is no potential stall for the first sample, then the counter is decremented to −1 but the Min/Max function 960 constrains the counter so that it remains at zero. This situation remains for each sample until a potential stall is detected, and the counter is incremented to 1.

The counter is divided by Max at step 962, and the output 964 is compared with a second threshold (Threshold_2) at step 966. For example, if Max=10 and Threshold_2 is 0.8, then the output 964 is 0.1 and Threshold_2 is not exceeded.

As an example, if a potential stall is detected for the next eight samples, then the output 964 remains below Threshold_2 until the counter has reached 9 on the ninth sample, the output 964 has increased to 0.9, and Threshold_2 is exceeded so the threshold comparison step 966 outputs an indication that the rotor is stalled, confirming a change in the stall condition from "not stalled" to "stalled".

As soon as the counter is decremented to 0.8, the output 964 no longer exceeds Threshold_2 so the threshold comparison step 966 outputs an indication that the rotor is not stalled.

Thus, the stall condition output by the threshold comparison step 966 provides a binary estimation of whether or not the rotor has stalled, which is more reliable than the potential stall condition output by the threshold comparison step 950.

The process can be fine-tuned by choosing appropriate values for the various parameters (Max, the size of increment/decrement at steps 952 and 954, Threshold_1 and Threshold_2).

The process of FIG. 11 implements a leaky bucket algorithm, which includes a calculation of a cumulative sum (in the form of a counter) which is compared with a threshold. Other statistical change detection algorithms may be used which involve the calculation of a cumulative sum, for instance a CUSUM algorithm.

Although the invention has been described above with reference to one or more preferred embodiments, it will be appreciated that various changes or modifications may be made without departing from the scope of the invention as defined in the appended claims.

The invention claimed is:

1. A method of measuring a stall condition of a rotor of a wind turbine, the method comprising:
   measuring a power parameter indicative of a power generated by the rotor;
   measuring a thrust parameter indicative of a thrust force generated by the rotor;
   obtaining a stall parameter on a basis of the power parameter and the thrust parameter, obtaining the stall parameter comprising dividing the power parameter and the thrust parameter;
   comparing the stall parameter with a threshold to determine a binary stall condition of the rotor, estimating of whether or not the rotor has stalled; and
   controlling the wind turbine in accordance with the stall condition.

2. The method of claim 1, wherein the power parameter is based on a sum of an electrical power generated by the rotor and a power loss parameter.

3. The method of claim 1, further comprising obtaining a wind speed measurement, and normalising the stall parameter on a basis of the wind speed measurement.

4. The method of claim 1, wherein the power parameter is a power coefficient and/or wherein the thrust parameter is a thrust coefficient.

5. The method of claim 1, further comprising determining an operating point of the rotor; obtaining a theoretical power parameter and a theoretical thrust parameter based on the operating point of the rotor; and obtaining the stall parameter on a basis of the theoretical power parameter and the theoretical thrust parameter.

6. The method of claim 1, further comprising obtaining a time series of measurements of a performance parameter indicative of a performance of the rotor, each measurement in the time series being associated with an operating point of the rotor; analysing the time series of measurements to obtain a statistical measure of a sensitivity of the performance parameter with respect to the operating point of the rotor;

and comparing the statistical measure with a threshold to determine the stall condition of the rotor.

7. The method of claim 5, wherein the operating point of the rotor is based on a tip speed ratio and/or a blade pitch angle of the rotor.

8. The method of claim 6, wherein the performance parameter is indicative of a power or a thrust generated by the rotor.

9. The method of claim 6, wherein the stall condition indicates that the rotor is stalled when the statistical measure exceeds the threshold.

10. The method of claim 1, further comprising repeating the method over time to obtain a time series of measurements of the stall condition of the rotor; and analysing the time series of measurements of the stall condition of the rotor by a statistical change detection algorithm to confirm a change in the stall condition.

11. The method of claim 1, further comprising obtaining a time series of measurements of the wind turbine; and analysing the time series of measurements by a statistical change detection algorithm to determine whether the rotor has stalled.

12. The method of claim 1, wherein controlling the wind turbine in accordance with the stall condition comprises adjusting a pitch angle of wind turbine blades in response to a change in the stall condition.

13. A computer program product comprising a non-transitory computer readable medium storing software code which, when executed on a data processing system, performs an operation, comprising:
measuring a power parameter indicative of a power generated by the a rotor;
measuring a thrust parameter indicative of a thrust force generated by the rotor;
obtaining a stall parameter on a basis of the power parameter and the thrust parameter, obtaining the stall parameter comprising dividing the power parameter and the thrust parameter;
comparing the stall parameter with a threshold to determine a binary stall condition of the rotor, estimating of whether or not the rotor has stalled; and
controlling thea wind turbine in accordance with the stall condition.

14. The computer program product of claim 13, wherein controlling the wind turbine in accordance with the stall condition comprises adjusting a pitch angle of wind turbine blades in response to a change in the stall condition.

* * * * *